United States Patent [19]

Dinter

[11] Patent Number: 4,849,121
[45] Date of Patent: Jul. 18, 1989

[54] LATENT HEAT STORE

[76] Inventor: Wolfgang Dinter, Math. Paravicinistrasse 5,, 4052 Basel, Switzerland

[21] Appl. No.: 887,561

[22] Filed: Jul. 17, 1986

[30] Foreign Application Priority Data

Jul. 20, 1985 [CH] Switzerland ............ 3180/85
Jul. 20, 1985 [CH] Switzerland ............ 3181/85
Jul. 20, 1985 [CH] Switzerland ............ 4032/85

[51] Int. Cl.$^4$ ............................................. C09K 5/06
[52] U.S. Cl. .................................................. 252/70
[58] Field of Search ........................................ 252/70

[56] References Cited

U.S. PATENT DOCUMENTS 3,951,127 4/1976 Watson et al. ............... 252/70
4,331,556 5/1982 Arrhenius .................... 252/70

FOREIGN PATENT DOCUMENTS 2844810 5/1979 Fed. Rep. of Germany ........ 252/70

Primary Examiner—Robert A. Wax
Attorney, Agent, or Firm—Brooks & Kushman

[57] ABSTRACT

A latent heat energy store is disclosed with a crystallizable heat storage material, which is capable of absorbing heat on melting and liberating heat again on crystallization, wherein the storage material also includes a crystallization inhibitor which has the property of stabilizing the storage material in the molten state without heat insulation and without energy loss at a temperature below the enthalpy temperature of said heat storage material, when desired to achieve a heating affect, crystallization is affected by using any known triggering method.

17 Claims, 2 Drawing Sheets

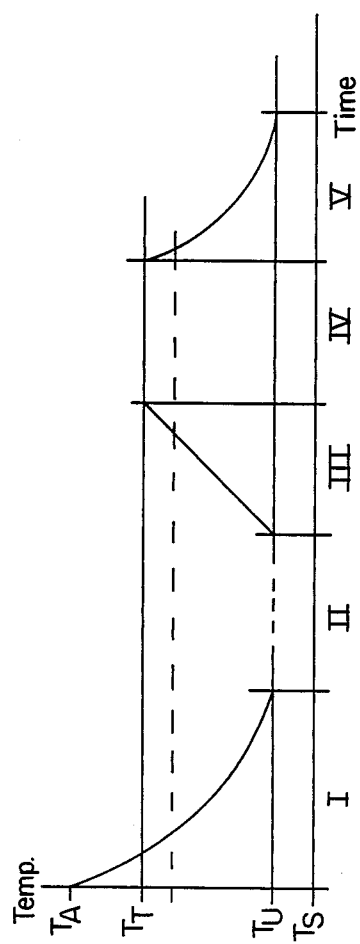

LATENT HEAT STORE

BACKGROUND OF THE INVENTION

The invention relates to specific supercoolable store materials for the storage of energy in the low temperature range in the form of latent heat which is taken up or liberated at the enthalpy point between the crystalline and the liquid phase of the material. The invention also relates to specific supercoolable latent heat stores based on certain specific materials.

As to the general state of the art in heat storage, reference is made to the chapter "Heat storage" in "Die Energie-Erzeugung, Nutzung, Versorgung" (Energy Provision, Use and Supply"), Bibliographisches Institut Mannheim, Vienna, Zurich, 1983.

TECHNICAL FIELD OF THE INVENTION

In a latent heat store use is made of the binding energy of crystalline compounds as store materials which has to be expended on the melting of crystals in the form of melt enthalpy (latent heat) and which is liberated again from the melt on crystallization. During melting, or during crystallization, the temperature of the store material at the enthalpy point of the temperature profile remains essentially constant. In the low temperature range between ca. 0° and 100° C., which is particularly interesting for applications in daily life, such as for the storage of solar energy, use is made in particular of salt hydrates which also have available, apart for example from the heteropolar binding energy of melting, also the hydration energy whereby the value of the anticipated melt enthalpy is increased. In the case of heteropolar or ion formation—also termed simple polar binding—it is the electrostatic forces between the charged particles which are critical for the crystallization process.

A number of criteria govern selection amongst the many available materials for practical application in latent heat stores, the most important being:
1. As low as possible a price for the material and easy availability,
2. as high as possible a melting temperature related to the application and high melt enthalpy,
3. good heat conductivity in the liquid phase,
4. low volume change at the phase transition,
5. low mechanical aggressivity of the crystals,
6. low chemical aggressivity,
7. harmless to the environment when corrected used,
8. stability of cycle,
9. stability (of all properties) over a wide temperature range.

For many prior art applications one characteristic of salt hydrates which interferes with the operation of heat stores is known as "supercooling". In this case, crystallization on discharge does not occur at the enthalpy point, but only at lower temperature, with the result that the stored latent heat is not given off at the desired temperature. The temperature difference can be considerable. Many proposals are known whereby this supercooling may be prevented, e.g. by "innoculation" in order to attain evolution of heat at constant temperature.

In contradistinction hereto, it is the aim of the invention to utilize the supercooling effect over as wide a temperature range as possible below the transformation temperature (the enthalpy point). Should this range be successfully extended to below the operational ambient temperature of a heat store, then the latent heat contained in the liquid phase of the store material can be stored without loss (apart from cooling to the ambient temperature) for any period of time, without need for the store to be insulated and may be recalled at any time through innoculation. To achieve this, a few crystals are added to the melt which only need to correspond to the inherent structure of their crystals, i.e. which do not have to be isomorphic. It is also possible to use isotypical or epitaxic crystals.

Hitherto known supercoolable stores are, however, unable to fulfill the above-mentioned conditions. The store disclosed in U.S. Pat. No. 4,331,556 has the disadvantage that it has the tendency in the supercooled state to crystallize out in an uncontrolled manner, whereby the entire energy is given off at an undesirable point in time. Harmful premature crystallization of this nature may, for example, be brought about by penetration of particles of dirt (unintentional innoculation) or by unavoidable vibrations. Another latent heat store working with supercooled melt is described in DE-OS No. 25 17 921. The utilizability of this store has hitherto also not been proved. In particular, no store substance is cited which, on the one hand, possesses the requisite high conversion temperature for economically viable application and which, on the other hand, would be capable of being transferred without difficulty in the supercooled state without spontaneous crystallization.

SUMMARY OF THE INVENTION

It is an object of the present invention to prepare a store material in such a way that it is free of the cited disadvantages, fulfills the required conditions and, moreover, is only required for manufacturing purposes in a technically pure state.

In German Patent Specification No. 24 48 739 it is disclosed that sodium acetate trihydrate ($NaC_2H_3O_2 \cdot 3H_2O$) with a melting point at $+58°$ C., which may be altered as required through alteration of the water content in the salt hydrate within limits of a few ° C., can be supercooled to a critical supercooling temperature of ca. $-10°$ C. and that it is unaffected in this state by spontaneous triggering of crystallization through vibrations or impurities. Within the supercooling interval between the enthalpy temperature and the critical supercooling temperature briefly described as the lower threshold temperature, crystallization may be induced at any time through innoculation in known manner and the latent energy stored made use of. The charging of the store material then occurs through heating to the enthalpy temperature or above, whereby an upper threshold temperature of ca. 123° C. may not be exceeded.

In German Patent Specification No. 28 44 810 it is disclosed that sodium thiosulfate pentahydrate ($Na_2S_2O_3 \cdot 5H_2O$) with a melting point at +48 degrees C, which may be lowered within limits of a few degrees C by adding ethylenglycol up to 10%, has similar qualities.

Experiments have shown that the salt hydrates fulfill conditions 1-7, but that the details given as to the lower threshold temperature and stability in the supercooling interval do not apply, but that the store mass tends far rather to flocculate and crystallize out spontaneously in uncontrolled manner, whereby the entire energy is given off at an undesirable point in time. The storage is thus not cyclically reproducible with certainty. In addition, additives negatively influence the latent heat energy content.

It is thus the purpose of the invention to find an additive which in the capacity of crystallization inhibitor ensures a stable supercooling of sodium acetate trihydrate or sodium thiosulfate pentahydrate down to the vicinity of the critical supercooling temperature, the addition of which does not unfavourably alter the properties of the store material and is not too expensive.

Following many experiments with the most varied substances such as glycoses and glycerines it was finally found that the requirements for a store material on the basis of sodium acetate trihydrate or sodium thiosulfate pentahydrate may be met by adding to the latter a natural or synthetic organic substance in an aqueous emulsion or solution as a crystallization inhibitor in accordance with the characterizing part of the main claim.

Particularly preferred crystallization inhibitors are mustard, rose oil and caramelized sugar. Mustard is itself a mixture of compounds. For more details on the actual composition of mustard, reference is made to standard dictionaries such as Rompp Chemie Lexikon, Spalte 4002/3, Senf. Similar considerations apply to rose oil. Details of the actual ingredients of synthetic and natural rose oil are also to be found in Rompp, Spalte 3767/8, Rosenol. In Rompp 4th edition, mustard is, for example, said to contain 16 to 18% salt free dry matter, 0.94–1.85% allyl mustard oils, 7–12% raw fibers and up to 10% starch, Said mustard is referred to generically as Mostrich type mustard. Caramelized sugar means sugar which is turned into carmel by burning about 200 degrees C (Rompp, Spalte 2208).

In the case when the heat storage material is sodium acetate trihydrate and the crystallization inhibitor is rose oil, the rose oil is generally used as a 1% volume aqueous solution. Up to 10 volumes or more of this aqueous solution may be used. In the case of sodium thiosulfate pentahydrate, less rose oil is needed, e.g. only about 1 vol. % of the 1 vol. % aqueous solution. Similar considerations apply in the case of the aqueous solution of mustard. Some preferred ranges are set out in the accompanying claims.

The crystallization when triggered to liberate the stored energy at supercooled temperature spread with a speed which may be influenced by measured inherent in the invention. The more water is added to the substance, the slower crystallization takes. On the other hand, simultaneous recall at various points of the melt may shorten crystallization time.

It is thus possible to adapt the heat emanation of the store extensively to the purpose of the invention, i.e. it is possible to achieve an optimum interaction between heat supply and heat requirement in connection with the technical construction and design of the store and the heat exchanger.

It is a particular advantage of the inhibited heat store material of the invention that it is so insensitive to shocks that it may be transported e.g. by lorry or train, e.g. in containers and may also be pumped using conventional pumps and piping systems.

It was already known from U.S. Pat. No. 2,118,586 that small amounts of glycerine or ethyl glycol could be added to a mixture of sodium acetate trihydrate and a further salt hydrate, although these additives were intended to prevent a coarse crystalline structure.

If one considers the phase transition from the liquid to the solid phase, this may be divided into two stages. In the first stage a stable crystal seed is formed, in the second stage the crystal and then further crystals develop, until the melt is fully crystallized. It is known that greater energy is needed for the first stage than for the second stage and that the phenomenon of supercooling is caused by this energy threshold. The inhibitors of the invention clearly raise this energy threshold.

EXAMPLE 1

1 ml natural or synthetic rose oil is added to 1 l distilled water at room temperature. 0.1 dl of the emulsion is added to 1 l liquid sodium thiosulfate pentohydrate.

The invention will now be described in more detail with particular reference to the following Examples.

For reasons of cost the concentration of the rose oil in the emulsion is adjusted to 1%. It may also be higher. A low concentration does, however, raise the lowest threshold temperature down to which the supercooling is stable, in other words, narrows the supercooling interval.

EXAMPLE 2

50 g commercially available mustard are added to 500 g water and thoroughly stirred with heating up to 80° C. or more. It is appropriate to filter the emulsion whilst hot. 0.1 dl of the emulsion is added to 1 l molten sodium thiosulfate pentahydrate.

EXAMPLE 3

Cane or beet sugar is melted in a crucible until the melt takes on a brown, but not yet dark brown, colour. 100 ml of the caramel-like melt are added to 100 ml water and stirred until a homogenous solution is formed. 0.1 dl of the solution is added to 1 l liquid sodium thiosulfate pentahydrate.

EXAMPLE 4

1 ml of natural or synthetic rose oil is mixed with 1 l of distilled water at room temperature. 1 dl of the emulsion is added to 1 l of liquid sodium acetate trihydrate.

For reasons of cost the concentration of the rose oil in the emulsion is set at 1 part per thousand. It may also be higher. However, a lower temperature raises the lowest threshold temperature, down to which the supercooling is stable, and thus narrows the supercooling interval.

EXAMPLE 5

50 g of commercially available mustard are added to 500 g water and stirred thoroughly whilst heating up to 80° C. or above. The emulsion is preferably filtered whilst hot. 1 dl of the emulsion is added to 1 l liquid sodium acetate trihydrate.

The concentration of mustard in water is not critical. It may be up to 100% (mustard intrinsically contains a proportion of water): The mustard is heated above the ambient temperature and mixed with the liquid sodium acetate trihydrate, also in a proportion of 1:10. Here the store material however does not remain liquid below the transformation temperature, but goes into a pasty state from which it passes into the crystalline state following innoculation with liberation of the stored latent heat.

EXAMPLE 6

Cane and beet sugar are melted in a crucible until the melt takes on a brown, but not yet dark brown colour. 100 ml of the caramel-like melt are added to 100 ml water and stirred until a homogenous solution is formed. 1 dl of the solution is added to 1 l liquid sodium acetate trihydrate.

The proportions given in the examples are approximate values only. The 10% or 1% proportion of the emulsion or solution may, for example, be increased up to 40% (or 20%). As is known, however, a higher proportion of water in the salt hydrate reduces the latter's conversion temperature and diminishes its latent heat energy content. If desired, crystalline mica may be added to the store material where sodium acetate trihydrate is the heat store material.

The relative proportions in the examples are approximate values only. The proportions of emulsion or solution may be greatly increased. Where there is a higher proportion of water on the salt hydrate, its conversion temperature is however, diminished as is known. If desired, crystalline mica may be added to the store substance, as is known from DE-OS No. 32 03 306.

Experiments have shown that a latent heat store material to which the inhibitors according to the invention are added fulfills the criteria hereinbefore set out. The lower threshold temperature is about 0° C. In the supercooling interval between the enthalpy temperature and this threshold temperature the liquid phase is maintained without flocculation, sedimentation or chemical change. The crystallization of the mixture can neither be triggered by external mechanical loading such as vibrations or shaking, nor by ionization or impurities, but only by targetted measures, i.e. by innoculation. Experiments have furthermore shown that, even with storage over many years, neither sedimentation not chemical change occurs in the material. Faulty crystals (different lattice structure) may be formed, but disappear in the melt during the next heating cycle. There are also no problems regarding the temperature range between the upper threshold temperature and the enthalpy temperature which is important for many applications such as liquid stores, non-supercoolable latent heat stores and stable supercoolable latent heat stores.

DESCRIPTION OF THE DRAWING

The diagram shows in schematic form the behaviour of a non-insulated latent heat store during cooling after charging. The store is charged up to he temperature $T_A$ which lies above the transformation temperature $T_U$ until such time as its entire contents have liquified. If the charging is interrupted prematurely, crystal seeds remain in the melt already present which would immediately trigger transformation on subsequent cooling at temperature $T_U$ and the stored latent heat would be liberated.

Left to itself, the store cools down to the ambient temperature $T_S$ (supercooling temperature) (range I); in so doing giving off the specific heat of its content in accordance with the interval $\Delta T = T_A = T_{UK}$. Its latent heat, however, remains in the melt without energy loss for any period of time at temperature $T_{UK(range\ II)}$.

Should the heat content of the store be recalled, i.e. the latent heat be released, its temperature first rises to the transformation temperature $T_T$ (range III): the store once more takes up the specific heat released during the cooling process from the latent heat becoming available. At temperature $T_T$ the store temperature remains maintained with constant heat emission (e.g. via a heat exchanger) until the liquid phase has been transformed into the solid phase (range IV). Then the store once again cools down, whilst giving off its specific heat, of which part is still utilizable depending on the state of the utilizable temperature $T_U$ in the supercooling interval and is now discharged (range V). The cycle is repeated with renewed recharging.

It is of particular importance that the stores prepared in this matter are fully workable with technically pure substance, i.e. it is not necessary to use costly substances such as in chemically pure form nor having a higher degree of purity.

In addition, these stores are extensively unsusceptible to specific impurities, such as dust or even cigarette ash.

I claim:
1. In combination
   a supercoolable latent heat store material based on sodium acetate trihydrate, and
   a liquid additive material having properties of stabilization of the store material in its liquid phase between its melting temperature and its lowest threshold temperature in the supercoolable state,
   wherein said liquid additive material is selected from the group consisting of an aqueous emulsion of a vegetable oil selected from the group consisting of rose oil and mustard oil and an aqueous solution of caramelized sugar, each of said additives acting to inhibit crystallization of the heat store material.

2. The combination set forth in claim 1, wherein the crystallization inhibitor is rose oil.

3. The combination set forth in claim 1, wherein the crystallization inhibitor is mustard.

4. The combination set forth in claim 2 wherein the inhibitor in an aqueous emulsion of about 1 vol-parts per thousand of rose oil in a concentration of about 10 vol.-% of the store material.

5. The combination set forth in claim 3, wherein the inhibitor is an aqueous emulsion of about 10 vol-% of mustard in a concentration of about 10 vol-% of the store material.

6. The combination set forth in claim 5 wherein the store material contains up to 10 vol-% of mustard.

7. The combination set forth in claim 1, wherein the inhibitor is an aqueous solution of about 50% caramelized sugar in a concentration of about 10 vol-% of the store material.

8. The combination set forth in claim 1, wherein the aqueous emulsion or solution constitutes from 10 to 40% of the store material.

9. The combination set forth in claim 1, wherein crystalline mica is added to the store material.

10. In combination
    a supercoolable latent heat store material based on sodium thiosulfate pentahydrate, and a liquid additive material having properties of stabilization of the store material in its liquid phase between its melting temperature and its lowest threshold temperature in the supercoolable state,
    wherein said liquid additive material is selected from the group consisting of an aqueous emulsion of a vegetable oil selected from the group consisting of rose oil and mustard oil and an aqueous solution of caramelized sugar, each of said additives acting to inhibit crystallization of the heat store material.

11. The combination set forth in claim 10, wherein the crystallization inhibitor is rose oil.

12. The combination set forth in claim 10, wherein the crystallization inhibitor is mustard.

13. The combination set forth in claim 11, wherein the inhibitor is an aqueous emulsion of about 1 vol-% of rose oil in a concentration of about 1 vol-% of the store material.

14. The combination set forth in claim 12, wherein the inhibitor is an aqueous emulsion of about 10 vol-% of mustard in a concentration of about 1 vol-% of the store material.

15. The combination set forth in claim 14, wherein the store material contains up to 10 vol-% of mustard.

16. The combination set forth in claim 10, wherein the inhibitor is an aqueous solution of about 50 vol-% caramelized sugar in a concentration of about 1 vol-% of the store material.

17. The combination set forth in claim 10, wherein the aqueous emulsion or solution constitutes from 1 to 20% of the store material.

* * * * *